United States Patent [19]

Nagy

[11] Patent Number: 5,462,707
[45] Date of Patent: Oct. 31, 1995

[54] METHOD OF PRODUCING ELASTIC WIPING BLADE FOR WINDSHIELD WIPER OF MOTOR VEHICLE

[75] Inventor: Tibor Nagy, Leuven, Belgium

[73] Assignee: Robert Bosch GmbH, Stuttgart, Germany

[21] Appl. No.: 246,099

[22] Filed: May 19, 1994

[30] Foreign Application Priority Data

Jun. 9, 1993 [DE] Germany ............... 43 19 139.8

[51] Int. Cl.[6] .................................................. B29C 69/00
[52] U.S. Cl. ................... 264/146; 264/152; 264/177.1; 264/177.17
[58] Field of Search ................... 264/146, 152, 264/177.1, 177.17; 15/250.001, 250.06, 250.41, 250.42

[56] References Cited

U.S. PATENT DOCUMENTS

| | | | |
|---|---|---|---|
| 1,771,824 | 7/1930 | Storrie | 15/250.41 |
| 2,651,800 | 9/1953 | Picon | 15/250.42 |
| 3,107,384 | 10/1963 | Wise | 15/250.42 |
| 3,174,173 | 3/1965 | Phillips et al. | 15/250.42 |
| 3,480,986 | 2/1969 | Forster . | |
| 3,744,947 | 10/1973 | Skobel . | |
| 4,712,989 | 12/1987 | Schiesser | 264/177.1 |
| 4,844,762 | 7/1989 | Schroder | 264/146 |
| 4,904,434 | 2/1990 | Hyer | 264/177.1 |
| 4,981,637 | 1/1991 | Hyer | 264/177.1 |
| 5,204,035 | 4/1993 | Boltze et al. | 264/177.1 |

FOREIGN PATENT DOCUMENTS

| | | |
|---|---|---|
| 0372745 | 6/1990 | European Pat. Off. . |
| 2239874 | 2/1975 | France . |
| 1952855 | 4/1971 | Germany . |
| 1067411 | 3/1967 | United Kingdom . |

*Primary Examiner*—Mathieu D. Vargot
*Attorney, Agent, or Firm*—Michael J. Striker

[57] ABSTRACT

A method of producing an elastic elongated wiping blade for a windshield wiper of a motor vehicle, which wiping blade includes a rear strip supported by a support and having a longitudinal passage which is closed from all sides by walls of the rear strip in a longitudinal direction for receiving an elastic reinforcing rail, the method includes the steps of extruding a wiping blade of a material in plastic deformable condition from an extruder nozzle, opening a longitudinal passages in the rear strip during exiting from the extruder nozzle over a longitudinal slot, closing the longitudinal slot by abutting wall portions of the longitudinal passage which form edges of the slot, against one another in soft condition so that the wall portions are connected with one another, and hardening the wiping blade so that the longitudinal passage is closed around in a longitudinal direction.

3 Claims, 2 Drawing Sheets

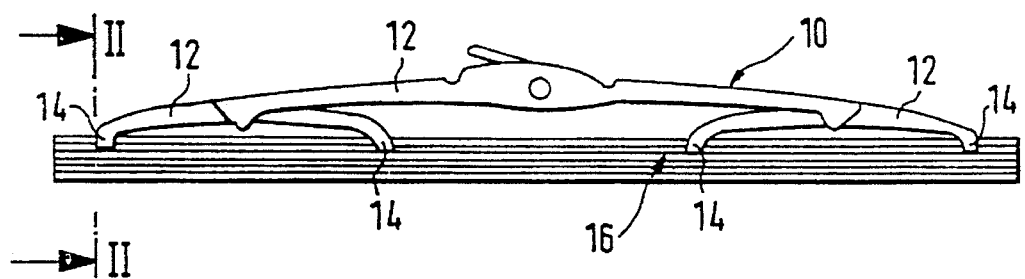
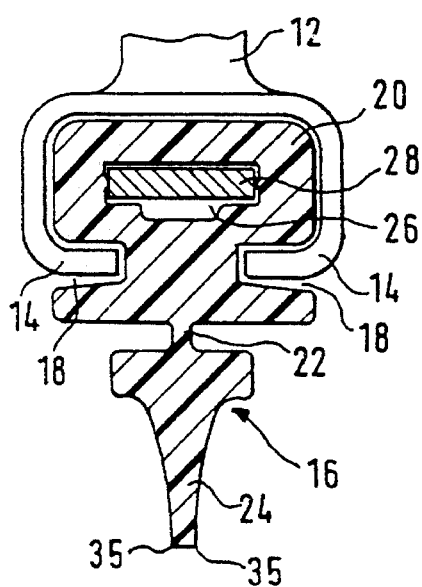
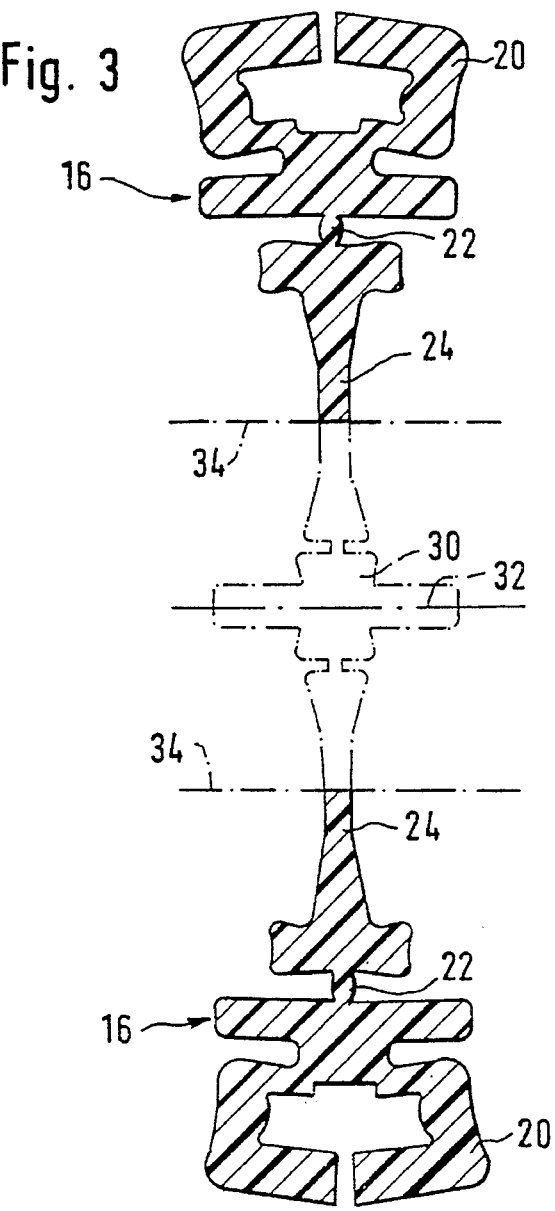

METHOD OF PRODUCING ELASTIC WIPING BLADE FOR WINDSHIELD WIPER OF MOTOR VEHICLE

BACKGROUND OF THE INVENTION

The present invention relates to a method of producing an elongated wiping blade for a windshield wiper of a motor vehicle composed of an elastic material.

More particularly, it relates to a method of producing a wiping blade for a windshield wiper, which has a rear strip held in a support and having an elongated passage formed by walls of the rear strip for receiving an elastic reinforcing rail.

A wiping blade of a windshield wiper of the above mentioned type is disclosed in U.S. Pat. No. 3,480,986. However, a method of manufacturing the above described wiping blade is not disclosed in the patent. For mounting the wiper strip on the wiper arm which serves as a support, its rear strip has a shaped hollow profile with a longitudinal passage. The longitudinal passage is used for receiving the elastically formed wiper arm and simultaneously performs the function of the reinforcing rail. Methods of manufacturing of the above described wiping blade can be further improved.

SUMMARY OF THE INVENTION

Accordingly, it is an object of the present invention to provide a method of producing an elongated wiping blade for a windshield wiper of a motor vehicle which is composed of an elastic material, which more advantageous than the existing methods.

In keeping with these objects and with others which will become apparent hereinafter, one feature of the present invention resides, briefly stated, in a method in accordance with which a wiper strip is further extruded from an extruder nozzle from a material which is first in a plastically deformable condition, opening a longitudinal passage provided in the rear strip during exiting from the extruder nozzle over a longitudinal slot, closing of the longitudinal passage wall portions which form the slot edge by abutting against one another, so that the wall portions are connected with one another and the longitudinal passage is closed in the longitudinal direction, and then hardening of the wiper strip.

When the wiping blade is produced by the inventive method it is also mounted on a support which is formed as a multi-part supporting bracket frame and in turn is connected with the wiper arm.

With the utilization of the method in accordance with the present invention it is possible to extrude special materials or material compositions required for the wiping blades and to form the required circumferentially closed longitudinal passage for the reinforcing rail, which was not possible previously with the use of the generally known hollow extrusion with the materials for the wiping blade described hereinabove.

In accordance with another feature of the present invention, the longitudinal slot produced during the extrusion is formed at the side of the rear strip which faces away from a wiping lip.

In accordance with still a further feature of the present invention, the longitudinal slot is located in the central region between both rear strip longitudinal edges, so that two wall portions are produced and connected with one another at opposite slot edges.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a wiping blade of a windshield wiper with a wiper strip which is held by a multi-part supporting bracket frame and composed of an elastic material;

FIG. 2 is a view showing a cross-section through the wiper strip taken along the line II—II in FIG. 1, on an enlarged scale;

FIG. 3 is a view showing a cross-section of an extruded strand on which two wiper strip profiles are formed;

DESCRIPTION OF THE PREFERRED EMBODIMENTS

Figure 4:
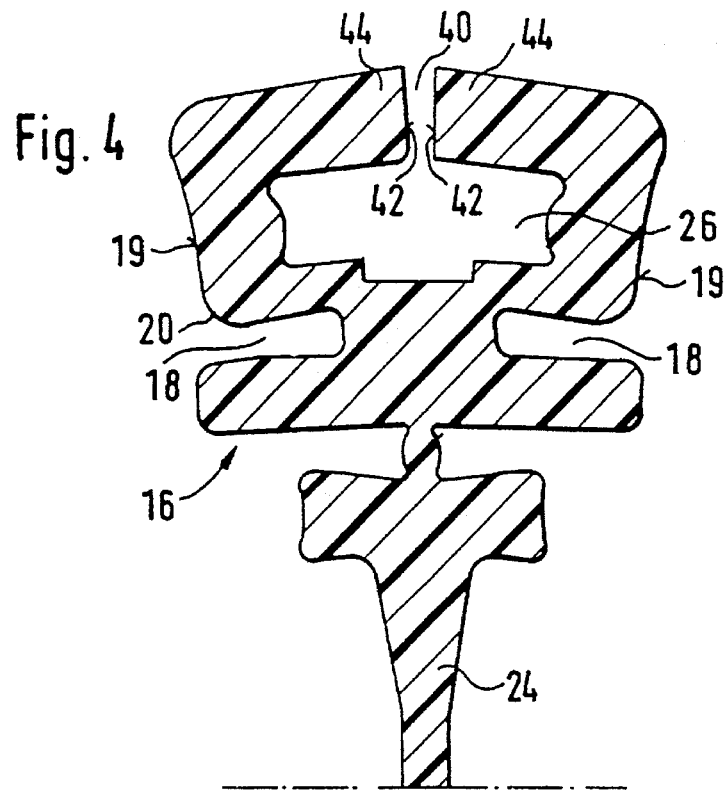
FIG. 4 is a view showing a cross-section of a wiper strip profile of FIG. 3 on an enlarged scale.

A wiping blade identified in FIG. 1 with reference numeral 10 has a multi-part supporting bracket frame 12 and an elongated wiping blade 16 which is held on the frame by holding claws 14 and composed of an elastic material. As can be seen from FIG. 2, the holding claws 14 of the parts of the frame 12 engage in so-called claw grooves 18 which are provided opposite to one another in longitudinal sides 19 of a longitudinally extending rear strip 20 of the wiping blade 16. The wiping blade 16 further has a wiping lip 24 which is connected with the rear strip 20 through a so-called tilting web 22. In the region of the wiping device it abuts against a windshield to be wiped.

As can be further seen from FIG. 2, the rear strip has a longitudinal throughgoing passage 26 in which an elastic reinforcing rail is accommodated. The reinforcing rail 28 can be composed for example of a spring band steel. It serves for orderly distribution of the force with which the wiping blade 10 is loaded against the windshield to be wiped. A further function of the reinforcing rail 28 is to stabilize the elastic wiping blade 16 when it moves transverse to its longitudinal extension over the windshield. The wiping blade 16 has an identical cross-section over its whole length. It is produced by extrusion as well known in the art.

As can be seen from FIG. 3, the profiles of two wiping blades 16 are formed from a material strand exiting a not shown extruder nozzle. The arrangement of both wiper strip profiles are selected to that their wiping lips 24 are located opposite to one another. An intermediate piece 30 shown in a broken line in FIG. 3, is located between both wiping lips 24, and its functions in the above described connection are not of importance. The design of both strand halves is selected so that a longitudinal central plane 32 identified in FIG. 3 with dash-dot line also forms a plane of symmetry for the strand halves. During the production of the wiping blade 16 the longitudinal central piece 3 is cut out from the strand along both dash-dot cutting lines 34 so as to produce two strands with identical profile from which portions of the wiper strips of desired length can be formed.

Figure 5:
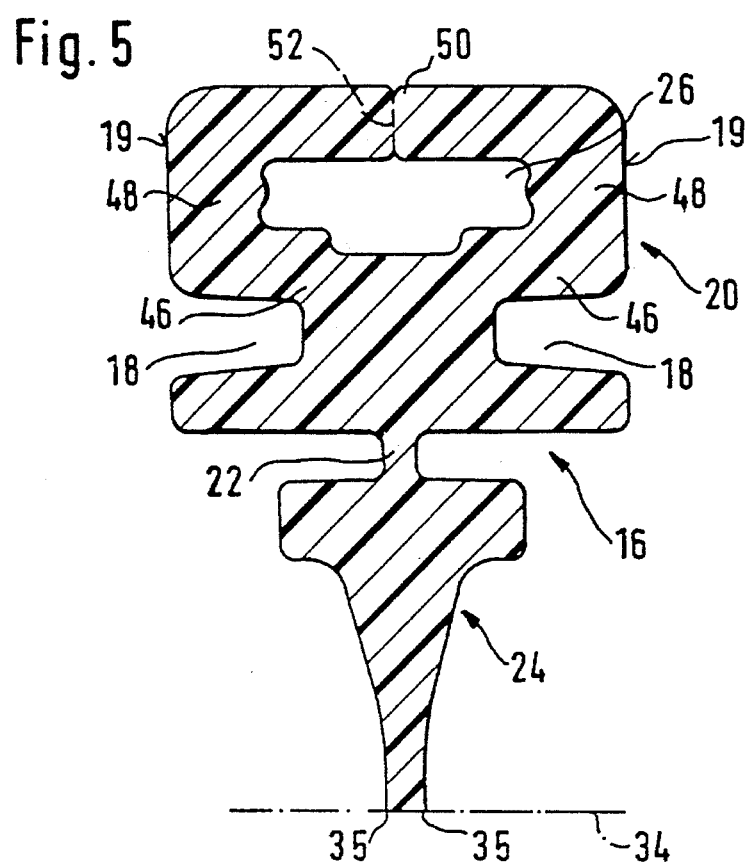
FIG. 5 is a view showing a cross-section through the wiper strip profile of FIG. 4, in which however the longitudinal passage is completely closed in the longitudinal direction.

It is however also known to cut portions of the desired length first from the whole strand whose cross-section is shown in FIG. 3, and then to cut the thusly obtained relatively short pieces along the cutting line 34. As a result, two wiping blades 16 and a central refuse piece identified in a broken line is produced. Wiping edges 35 are formed on the cutting line 34 as shown in FIGS. 2 and 5.

The difficulty in such a manufacturing process is that the throughgoing longitudinal passage 26 is arranged in the back of the wiping blade 16. In this case it is not possible to use known hollow extrusion processes. The wiping blade 16 must satisfy high requirements with respect to wear, strength, ozone resistance, light resistance, etc. Therefore, exactly determined material mixtures must be utilized which do not permit the so-called hollow extrusion since the material exiting the extruder nozzle has such a consistency that the maintaining of the throughgoing longitudinal passage is not guaranteed. It has been found that a preceding opening of the throughgoing longitudinal passage 26 via a longitudinal slot 40 to a side of the rear strip 20 directly after the extruding solves the above mentioned problem.

This embodiment is illustrated in FIG. 4 in which the extruded strand during exiting from the extrusion nozzle, when the extruded material is plastically deformable, is shown in cross-section. The longitudinal passage 26 is open over a longitudinal slot 40 arranged at a side of the wiping blade 16 which faces away from the wiping lip 24. Therefore the longitudinal slot 40 is located in the central region between both rear strip longitudinal sides 19. The passage at a time of exiting from the nozzle is not closed completely circumferentially. Shortly after this the longitudinal passage wall portions 44 which form the slot edges 42 are placed again on one another in soft condition, so that the longitudinal slot 44 is closed. At this point the material of the wall portions 44 of the rear wiping blade 16 is so soft that these wall portions 44 are connected with one another on the slot edges 42. Thereby the longitudinal throughgoing passage 26, when the extruder strand is hardened or vulcanized, is enclosed in the longitudinal direction at all sides by the walls 46, 48, 50 and the wall 60 is formed by joining and connection of the longitudinal passage wall portions 44 with one another. FIG. 5 shows in a broken line 52 how the wall 50 is formed by joining and connection of the slot edges 42.

The quality of the connection in the region of the previous slot edges 42 is sufficient to satisfy the requirements applied to the connecting seam 52. The abutment of the slot edges 42 against one another can be performed for example by corresponding device which is however not important for the present invention. What is important is that the passage wall portions 44 which form the slot edges 42 are placed against one another in soft condition so that they are connected with one another and in the shown embodiment produce the upper wall 52 of the rear wiping blade 16.

It will be understood that each of the elements described above, or two or more together, may also find a useful application in other types of methods differing from the types described above.

While the invention has been illustrated and described as embodied in a method for producing elastic wiping blade for windshield wiper of motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of producing an elastic elongated wiping blade for a windshield wiper of a motor vehicle, which wiping blade includes a rear strip supported by a support and having a longitudinal passage which is closed from all sides by walls of the rear strip in a longitudinal direction for receiving an elastic reinforcing rail, the method comprising the steps of extruding a wiping blade of a material in plastic deformable condition from an extruder nozzle; opening a longitudinal passage in the rear strip during exiting from the extruder nozzle over a longitudinal slot; closing the longitudinal slot by abutting wall portions of the longitudinal passage which form edges of the slot against one another in soft condition so that the wall portions are connected with one another; and hardening the wiping blade so that the longitudinal passage is closed around in a longitudinal direction.

2. A method as defined in claim 1, and further comprising the step of providing a wiping lip connected with the rear strip by a web; and forming the longitudinal slot produced during the extrusion at the side of the rear strip facing away from the wiping lip.

3. A method as defined in claim 1, and further comprising the step of forming the longitudinal slot in a central region between both longitudinal edges of the rear strip, so that the two wall portions are produced which are connected with one another at slot edges which are opposite to one another.

\* \* \* \* \*